(12) United States Patent
Gan et al.

(10) Patent No.: US 8,570,889 B2
(45) Date of Patent: Oct. 29, 2013

(54) FILTER OR AMPLIFIER ADAPTATION BY AN INTERMEDIATE DEVICE IN A MULTI-HOP SYSTEM

(75) Inventors: Jiansong Gan, Beijing (CN); Peter Larsson, Solna (SE); Qingyu Miao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 354 days.

(21) Appl. No.: 12/992,322

(22) PCT Filed: Jul. 4, 2008

(86) PCT No.: PCT/EP2008/058715
§ 371 (c)(1),
(2), (4) Date: Nov. 12, 2010

(87) PCT Pub. No.: WO2010/000337
PCT Pub. Date: Jan. 7, 2010

(65) Prior Publication Data
US 2011/0064006 A1    Mar. 17, 2011

(51) Int. Cl.
*H04J 1/16* (2006.01)
*H04B 7/208* (2006.01)
(52) U.S. Cl.
USPC .......................................... 370/252; 370/319
(58) Field of Classification Search
None
See application file for complete search history.

(56) References Cited

U.S. PATENT DOCUMENTS

| | | | |
|---|---|---|---|
| 2006/0192371 A1* | 8/2006 | Abe | 280/739 |
| 2007/0116106 A1 | 5/2007 | Hart | |
| 2007/0217433 A1* | 9/2007 | Doppler et al. | 370/400 |
| 2008/0049658 A1 | 2/2008 | Asai et al. | |
| 2008/0080436 A1* | 4/2008 | Sandhu et al. | 370/338 |
| 2008/0220790 A1* | 9/2008 | Cai et al. | 455/450 |
| 2008/0274692 A1* | 11/2008 | Larsson | 455/24 |
| 2009/0135724 A1* | 5/2009 | Zhang et al. | 370/241 |
| 2009/0285112 A1* | 11/2009 | Lee et al. | 370/252 |
| 2010/0074126 A1* | 3/2010 | Chen et al. | 370/252 |
| 2010/0330902 A1* | 12/2010 | Fujita | 455/7 |

FOREIGN PATENT DOCUMENTS

EP    1 895 702 A2    3/2008
JP    2008-054215 A    3/2008

OTHER PUBLICATIONS

Wittneben, A. et al., "Joint Cooperative Diversity and Scheduling in Low Mobility Wireless Networks", Global Telecommunications Conference, GLOBECOM '04, vol. 2, (Nov. 29, 2004), pp. 780-784.

\* cited by examiner

*Primary Examiner* — Andrew Lee
(74) *Attorney, Agent, or Firm* — Nixon & Vanderhye, P.C.

(57) ABSTRACT

A method is performed by an intermediate device in a wireless network. The method includes estimating a first hop channel state based on a transmission originating from a first device. The method further includes estimating an end-to-end signal-to-noise ratio base on a transmission associated with a second device. The method also includes adapting a filter or an amplifier of the intermediate device based on the first hop channel state and the end-to-end signal-to-noise ratio.

27 Claims, 14 Drawing Sheets

FILTER OR AMPLIFIER ADAPTATION BY AN INTERMEDIATE DEVICE IN A MULTI-HOP SYSTEM

This application is the U.S. national phase of International Application No. PCT/EP2008/058715 filed 4 Jul. 2008, which designated the U.S. and the entire contents of which is hereby incorporated by reference.

TECHNICAL FIELD

Implementations described herein relate generally to a communication system. More particularly, implementations described herein relate to a processing scheme for adapting the operation of an intermediate device in a communication system.

BACKGROUND

In a communication system, such as a wireless communication system, devices may communicate with one another via an intermediary device. For example, a wireless station and user equipment (UE) may communicate via a repeater. In some instances, the wireless station, UE and/or the repeater may include multiple antennas (e.g., a multiple-input multiple-out (MIMO) device).

In the case of intermediate devices, such as a repeater, the intermediate device may perform various operations with respect to received and/or forwarded transmissions. For example, the repeater may amplify a received transmission and forward the transmission to another device. Depending on the repeater, the repeater sometimes may not adapt its filtering or amplification for transmissions received and forwarded based on a channel state that exists between the repeater and another device (e.g., the wireless station or the UE). In other instances, however, the repeater may adapt its filtering or amplification for transmissions received and forwarded. For example, the repeater may utilize first hop channel state information (CSI) to perform various operations (e.g., singular value decomposition (SVD) beamforming or spatial filtering (e.g., linear minimum mean-squared error (LMMSE) or least square). While both of these types of repeaters may provide a significant degree of transparency, these repeaters may be limited in enhancing the rate-coverage performance of the communication system.

In more sophisticated repeaters, the repeater may utilize first hop CSI and second hop CSI. For example, the repeater may obtain SVD of the channels of the first and second hops. However, it is difficult to obtain the second hop CSI before forwarding a received transmission while simultaneously maintaining transparency in the communication system. For example, the repeater may create additional overhead (e.g., signaling) to the second hop device to obtain the second CSI.

SUMMARY

It is an object to obviate at least some of the above disadvantages and to improve the operability of devices within a communication system.

According to one aspect, a method performed by an intermediate device in a wireless network, which includes a first hop between a first device and the intermediate device, and a second hop between the intermediate device and a second device, may include estimating a first hop channel state based on a transmission associated with the first device, estimating an end-to-end signal-to-noise ratio based on a transmission associated with the second device, and adapting a filter or an amplifier of the intermediate device based on the first hop channel state and the end-to-end signal-to-noise ratio.

According to another aspect, an intermediate device in a wireless environment that includes a first hop between a first device and the intermediate device and a second hop between the intermediate device and a second device, where the intermediate device may include one or more antennas and a processing system to estimate a first hop channel state based on a transmission from the first device, estimate an end-to-end signal-to-noise ratio or a second hop signal-to-noise ratio based on a transmission from the second device, and adapt a filter or an amplifier based on the first hop channel state and at least one of the end-to-end signal-to-noise ratio or the second hop signal-to-noise ratio.

According to yet another aspect, a computer program including instructions to estimate a first hop channel state based on a received first hop transmission, estimate a second hop signal-to-noise ratio or an end-to-end signal-to-noise ratio based on a received second hop transmission, and adapt at least one of a filter or an amplification parameter based on the first hop channel state and at least one of the second hop signal-to-noise ratio or the end-to-end signal-to-noise ratio.

DETAILED DESCRIPTION

The following detailed description refers to the accompanying drawings. The same reference numbers in different drawings may identify the same or similar elements. Also, the following description does not limit the invention.

The concepts described herein relate to a communication system. The communication system is intended to be broadly interpreted to include any type of wireless network, such as a cellular network and/or a mobile network (e.g., Global System for Mobile Communications (GSM), Long Term Evolution (LTE), Wideband Code Division Multiple Access (WCDMA), Ultra Mobile Broadband (UMB), Universal Mobile Telecommunications Systems (UMTS), Code Division Multiple Access 2000 (CDMA2000), ad hoc networks, High-Speed Packet Access (HSPA), etc.), and a non-cellular network (e.g., Wireless Fidelity (Wi-Fi), Worldwide Interoperability for Microwave Access (WiMax), etc.). In this regard, it will be appreciated that the concepts described herein are not platform dependent and may be implemented within a wide variety of communication systems. The terms communication system and network may be used interchangeably throughout this description. The communication system may include a multi-hop network. The communication system may include one or more devices that correspond to a MIMO device.

Embodiments described herein may provide that an intermediate device of a communication system may utilize first hop CSI and end-to-end signal-to-noise ratio information to significantly improve the rate-coverage performance of the communication system. The intermediate device may determine first hop CSI and end-to-end signal-to-noise ratio information based on transmissions received from other devices in the communication system. Thus, the intermediate device may not create additional overhead and may remain transparent in the communication system. Other advantages that necessarily flow therefrom will be described below.

Figure 1A:
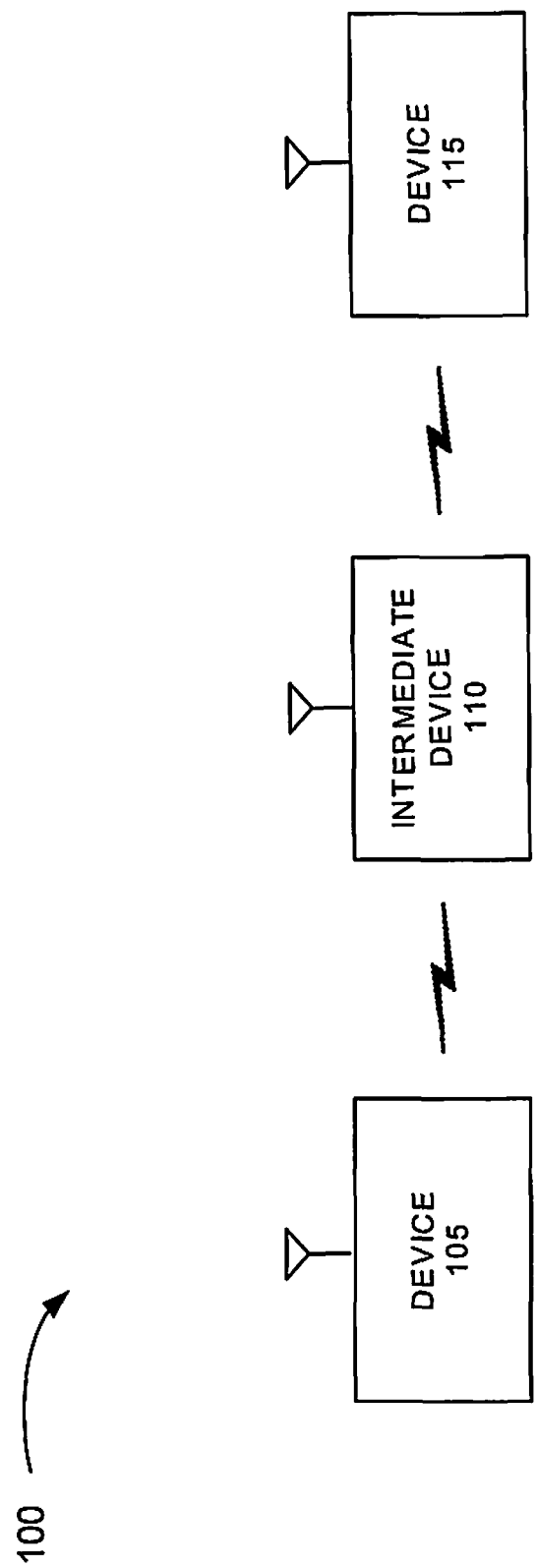
FIG. 1A is a diagram illustrating devices communicating with one another via an intermediate device.

FIG. 1A is a diagram illustrating an exemplary communication system 100 in which the concepts described herein may be implemented. As illustrated, communication system 100 may include a device 105, an intermediate device 110, and a device 115. A device may include, for example, a UE, a gateway, a base station, a relay, a repeater, a combination thereof, or another type of device (e.g., a satellite). The device may operate at layer 1, layer 2, and/or at a higher layer. As illustrated in FIG. 1A, the devices may be communicatively coupled. For example, the devices may be communicatively coupled via wireless communication links (e.g., radio, microwave, etc.).

Figure 1B:
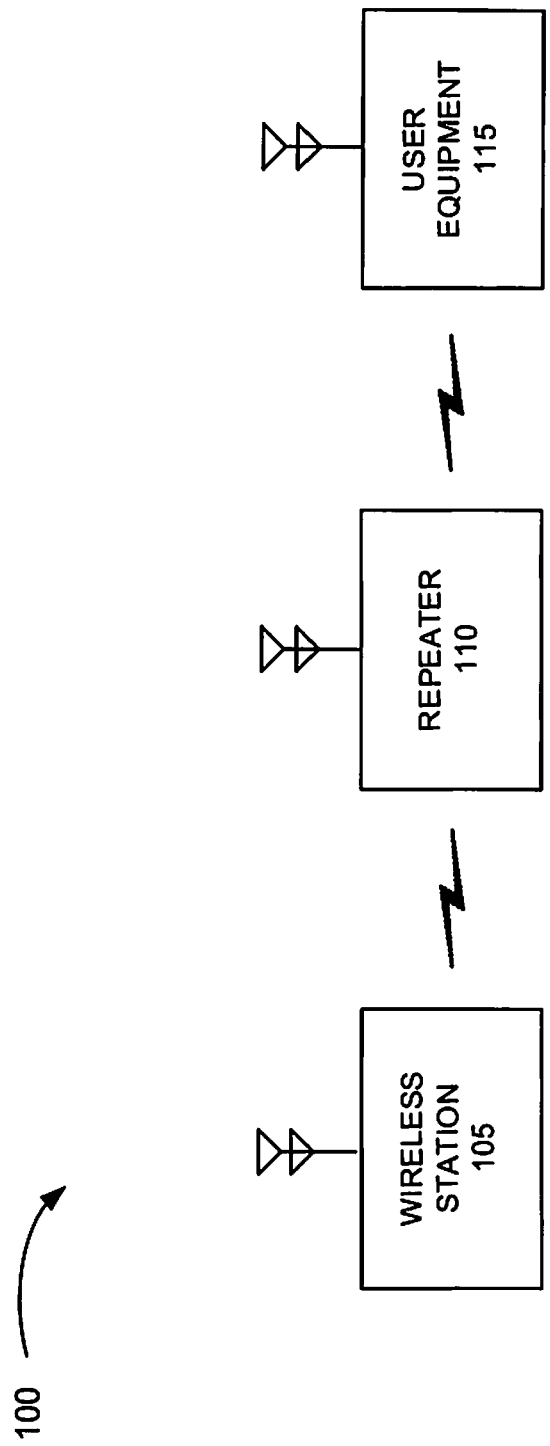
FIG. 1B is a diagram illustrating an exemplary implementation of the devices depicted in FIG. 1A.

Since the concepts described herein are applicable to a variety of devices in communication system 100, communication system 100 will be described based on the exemplary devices illustrated in FIG. 1B. FIG. 1B illustrates an exemplary implementation in which device 105 includes a wireless station, intermediate device 110 includes a repeater, and device 115 includes UE. FIG. 1B illustrates wireless station 105, repeater 110 and UE 115 as communicatively coupled to form a multi-hop network.

Wireless station 105 may include a device having communication capability. The term wireless station is intended to be broadly interpreted to include, for example, a device that may communicate with UE 115 via repeater 110. For example, a wireless station may include a base station (BS), a base station transceiver (BTS) (e.g., in a GSM communication system), an eNodeB (e.g., in a LTE communication system), a Node B (e.g., in a UMTS communication system), or some other type of device.

Repeater 110 may include a device having communication capability. For example, repeater 110 may include an on-frequency repeater (OFR) or a frequency translation repeater (FTR). Repeater 110 may include a device capable of adapting a filter or amplifying of transmissions received and/or forwarded, as will be described in greater detail below.

UE 115 may include a device having communication capability. For example, UE 115 may include a telephone, a computer, a personal digital assistant (PDA), a gaming device, a music playing device, a video playing device, a web browser, a personal communication system (PCS) terminal, a pervasive computing device, and/or some other type of device.

Figure 2:
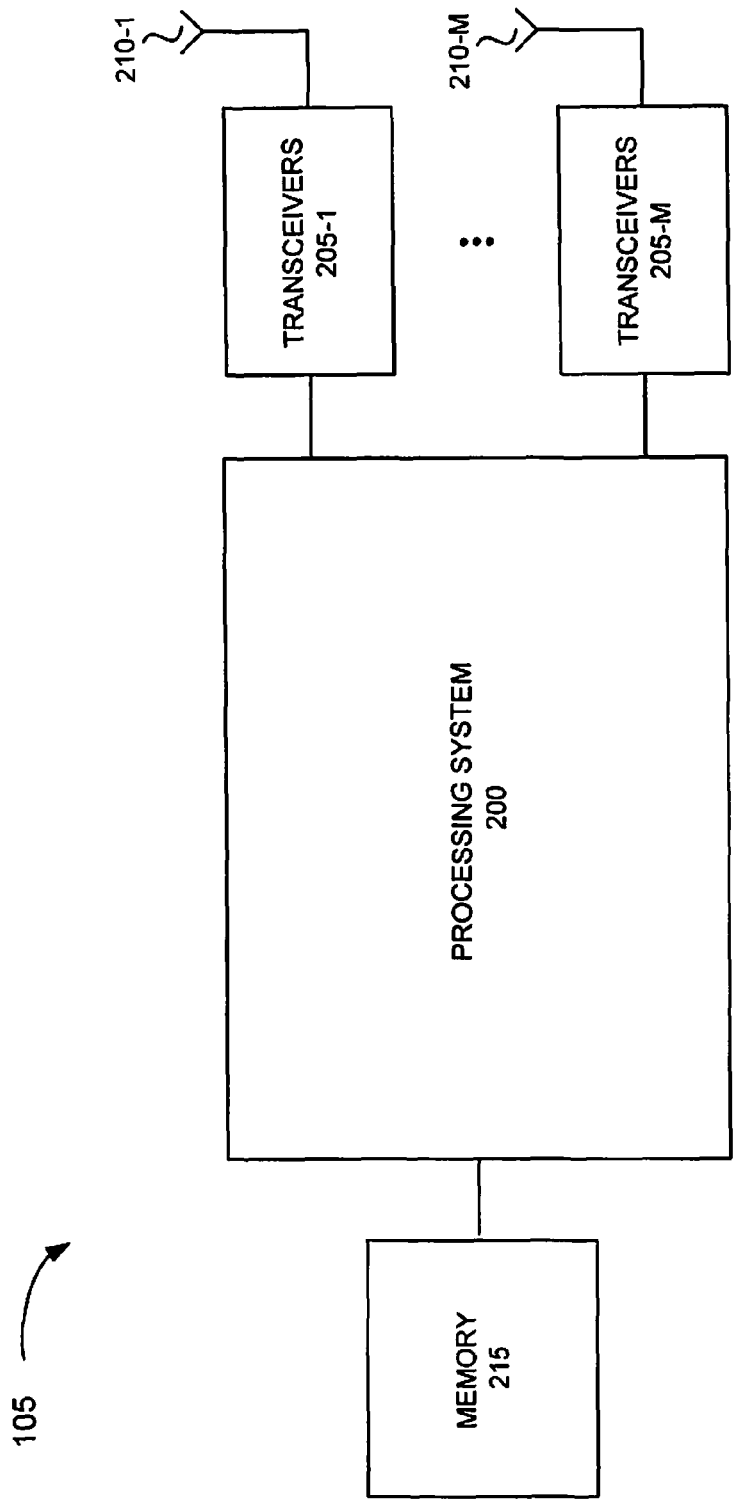
FIG. 2 is a diagram illustrating exemplary components of the wireless station depicted in FIG. 1B.

FIG. 2 is a diagram illustrating exemplary components of wireless station 105. As illustrated, wireless station 105 may include a processing system 200, transceivers 205-1 to 205-M, antennas 210-1 to 210-M, and a memory 215. Transceivers 205-1 to 205-M may be referred to as transceiver 205. Similarly, antennas 210-1 to 210-M may be referred to as antenna 210. The term component is intended to be broadly interpreted to include, for example, hardware, software and hardware, firmware, software, or some other type of component.

Processing system 200 may include a component capable of interpreting and/or executing instructions. For example, processor 200 may include, a general-purpose processor, a microprocessor, a data processor, a co-processor, a network processor, an application specific integrated circuit (ASIC), a controller, a programmable logic device, a chipset, and/or a field programmable gate array (FPGA). Processing system 200 may control one or more other components of wireless station 105. Processing system 200 may be capable of performing various communication-related processing (e.g., signal processing, channel estimation, beamforming, power control, scheduling, etc.).

Transceiver 205 may include a component capable of transmitting and/or receiving information over wireless channels via antennas 210. For example, transceiver 205 may include a transmitter and a receiver. Transceiver 205 may be capable of performing various communication-related processing (e.g., de/modulation, de/interleaving, equalizing, filtering, de/coding, etc.). Antenna 210 may include a component capable of receiving information and transmitting information via wireless channels. In one implementation, antenna 210 may include a multi-antenna system (e.g., a MIMO antenna system). Antenna 210 may provide one or more forms of diversity (e.g., spatial, pattern, or polarization).

Memory 215 may include a component capable of storing information (e.g., data and/or instructions). For example, memory 215 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 2 illustrates exemplary components of wireless station 105, in other implementations, wireless station 105 may include fewer, additional, and/or different components than those depicted in FIG. 2. It will be appreciated that one or more components of wireless station 105 may be capable of performing one or more other tasks associated with one or more other components of wireless station 105.

Figure 3A:
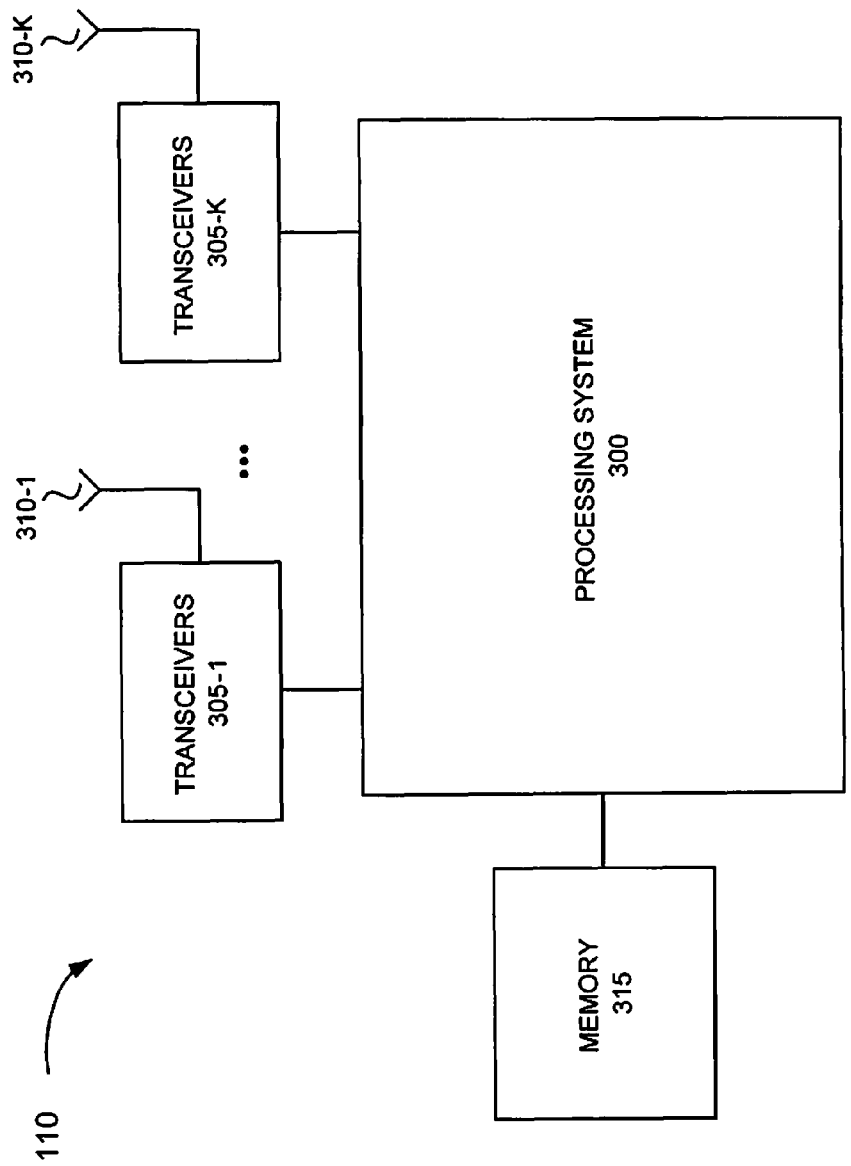
FIGS. 3A and 3B are diagrams illustrating exemplary components of the repeater depicted in FIG. 1B.

FIG. 3A is a diagram illustrating exemplary components of repeater 110. As illustrated, repeater 110 may include a processing system 300, transceivers 305-1 to 305-K, antennas 310-1 to 310-K, and memory 315. Transceivers 305-1 to 305-K may be referred to as transceiver 305. Similarly, antennas 310-1 to 310-K may be referred to as antenna 310.

Processing system 300 may include a component capable of interpreting and/or executing instructions. For example, processor 300 may include, a general-purpose processor, a microprocessor, a data processor, a co-processor, a network processor, an application specific integrated circuit (ASIC), a controller, a programmable logic device, a chipset, and/or a field programmable gate array (FPGA). Processing system 200 may control one or more other components of repeater 110. Processing system 200 may be capable of performing various communication-related processing (e.g., amplification, self-interference cancellation (SIC), frequency translation, etc.).

Transceiver 305 may include a component capable of transmitting and/or receiving information over wireless channels via antennas 310. For example, transceiver 305 may include a transmitter and a receiver. Transceiver 305 may be capable of performing various communication-related processing (e.g., filtering, de/coding, de/modulation, etc.). Antennas 310 may include a component capable of receiving information and transmitting information via wireless channels. In one implementation, antenna 310 may include a multi-antenna system (e.g., a MIMO antenna system). Antenna 310 may provide one or more forms of diversity (e.g., spatial, pattern, or polarization).

Memory 315 may include a component capable of storing information (e.g., data and/or instructions). For example, memory 215 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 3A illustrates exemplary components of repeater 110, in other implementations, repeater 110 may include fewer, additional, and/or different components than those depicted in FIG. 3A. It will be appreciated that one or more components of repeater 110 may be capable of performing one or more other tasks associated with one or more other components of repeater 110.

Figure 3B:
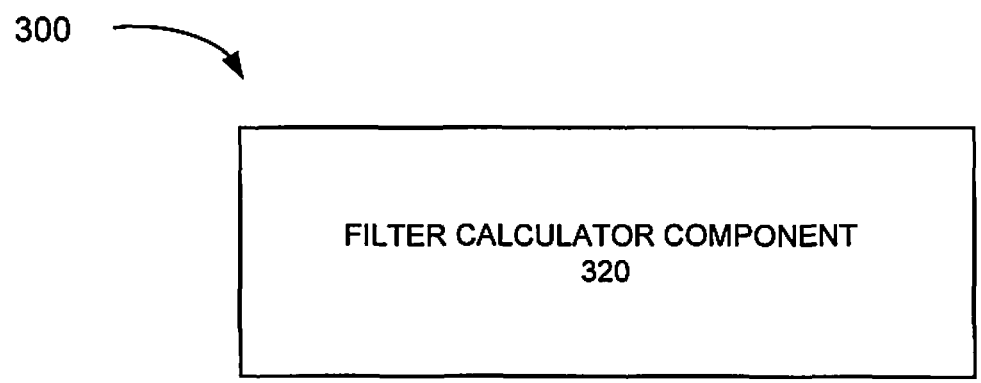

FIG. 3B is a diagram illustrating an exemplary functional component capable of performing one or more operations associated with the concepts described herein. In one embodiment the exemplary functional component may be implemented in processor 300 of repeater 110. However, it will be appreciated that this functional component may be implemented in connection with, for example, other components (e.g., transceiver 305) of repeater 110, in combination with two or more components (e.g., transceiver 305, processor 300, memory 315) of repeater 110, and/or as an additional component(s) to those previously described in FIG. 3A. As illustrated, the functional component includes a filter calculator component 320.

Filter calculator component 320 may adapt a filter and/or an amplifying component based on transmissions received from wireless station 105 and UE 115. Filtering component 320 may calculate various parameters based on, for example, first hop channel state information (CSI), end-to-end signal-to-noise ratio (SNR), and/or second hop SNR. As will be described in greater below, one or more of these parameters may be utilized in calculating a filter matrix.

Figure 4A:
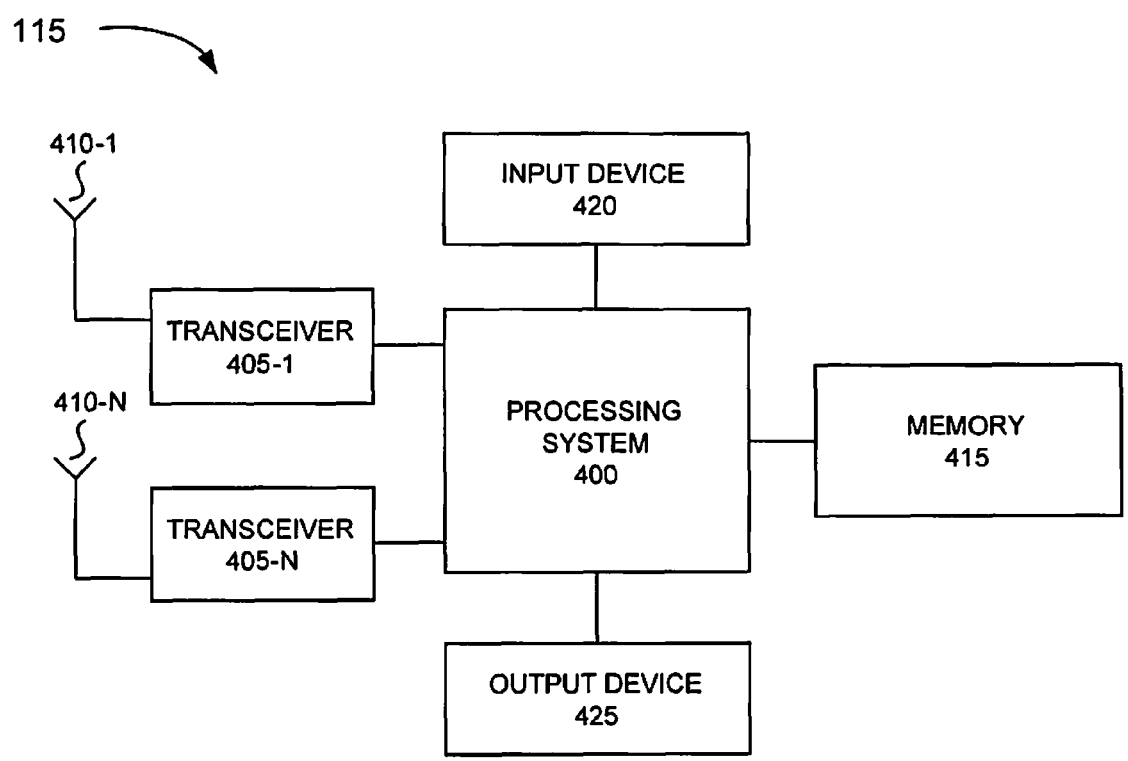
FIGS. 4A and 4B are diagrams illustrating exemplary components of the User Equipment (UE) depicted in FIG. 1B.

FIG. 4A is a diagram illustrating exemplary components of UE 115. As illustrated, UE 115 may include a processing system 400, transceivers 405-1 to 405-N, antennas 410-1 to 410-N, a memory 415, an input device 420, and an output device 425. Transceivers 405-1 to 405-N may be referred to as transceiver 405. Similarly, antennas 410-1 to 410-N may be referred to as antenna 410.

Processing system 400 may include a component capable of interpreting and/or executing instructions. For example, processing system 400 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 400 may control one or more other components of UE 115. Processing system 400 may be capable of performing various communication-related processing (e.g., signal processing, channel estimation, power control, timing control, etc.).

Transceiver 405 may include a component capable of transmitting and/or receiving information over wireless channels via antennas 410. For example, transceiver 405 may include a transmitter and a receiver. Transceiver 405 may be capable of performing various communication-related processing (e.g., filtering, de/coding, de/modulation, etc.). Antennas 410 may include a component capable of receiving information and transmitting information via wireless channels. In one implementation, antenna 410 may include a multi-antenna system (e.g., a MIMO antenna system). Antenna 410 may provide one or more forms of diversity (e.g., spatial, pattern, or polarization).

Memory 415 may include a component capable of storing information (e.g., data and/or instructions). For example, memory 415 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Input device 420 may include a component capable of receiving an input from a user and/or another device. For example, input device 420 may include a keyboard, a keypad, a mouse, a button, a switch, a microphone, a display, and/or voice recognition logic.

Output device 425 may include a component capable of outputting information to a user and/or another device. For example, output device 425 may include a display, a speaker, one or more light emitting diodes (LEDs), a vibrator, and/or some other type of visual, auditory, and/or tactile output device.

Although FIG. 4A illustrates exemplary components of UE 115, in other implementations, UE 115 may include fewer, additional, and/or different components than those depicted in FIG. 4A. For example, UE 115 may include a hard disk or some other type of computer-readable medium along with a corresponding drive. The term "computer-readable medium," as used herein, is intended to be broadly interpreted to include, for example, a physical or a logical storing device. It will be appreciated that one or more components of UE 115 may be capable of performing one or more other tasks associated with one or more other components of UE 115.

Figure 4B:
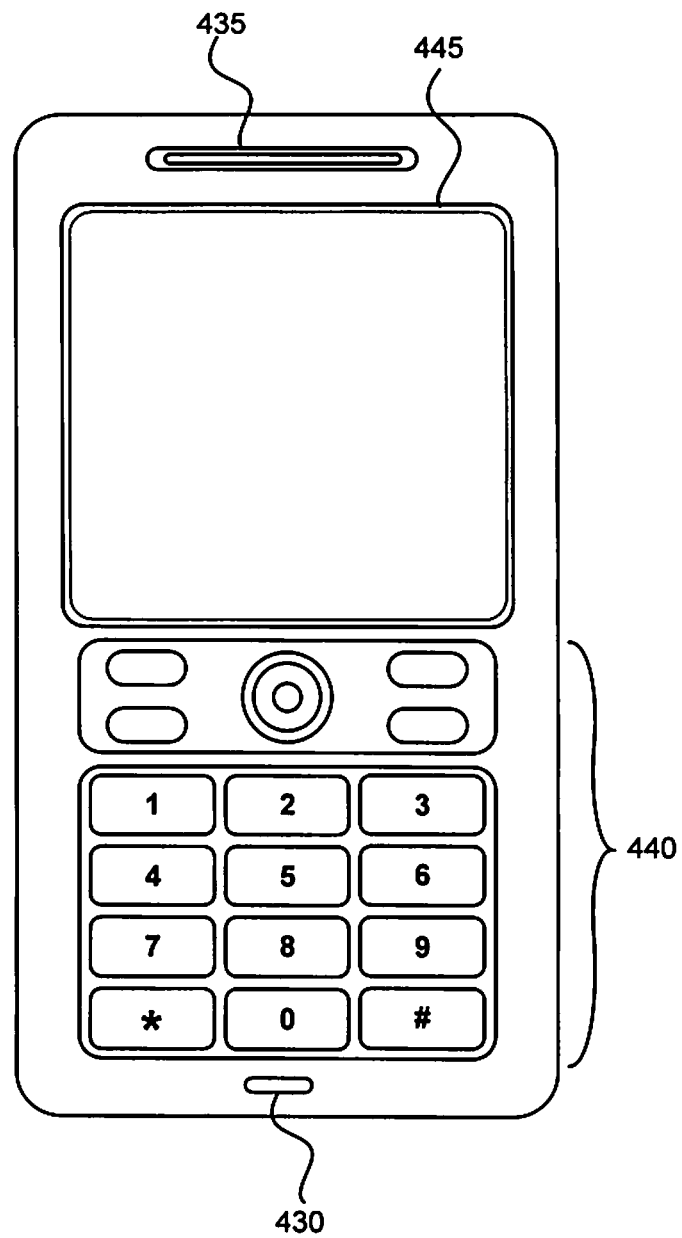

FIG. 4B is a diagram illustrating an exemplary implementation of UE 115, where UE 115 includes a radiotelephone. As illustrated, UE 115 may include a microphone 430 (e.g., of input device 420) for entering audio information, a speaker 435 (e.g., of output device 425) for outputting audio information, a keypad 440 (e.g., of input device 420) for entering information or selecting functions, and a display 445 (e.g., of input device 420 and/or output device 425) for outputting visual information and/or inputting information, selecting functions, etc.

Although FIG. 4B illustrates an exemplary implementation of UE 115, in other implementations, UE 115 may include fewer, additional, or different exemplary components than those depicted in FIG. 4B.

Exemplary processes are described below, in connection with FIGS. 5A to 7B, in which repeater 110 may adapt a filter or an amplifying component based on CSI in a manner that maintains transparency and enhances rate-coverage performance. For purposes of discussion, the exemplary processes will be described based on communication system 100 depicted in FIG. 1B. However, it will be appreciated that the exemplary processes may be performed in communication system 100 depicted in FIG. 1A, in which different devices may be present.

Figure 5A:
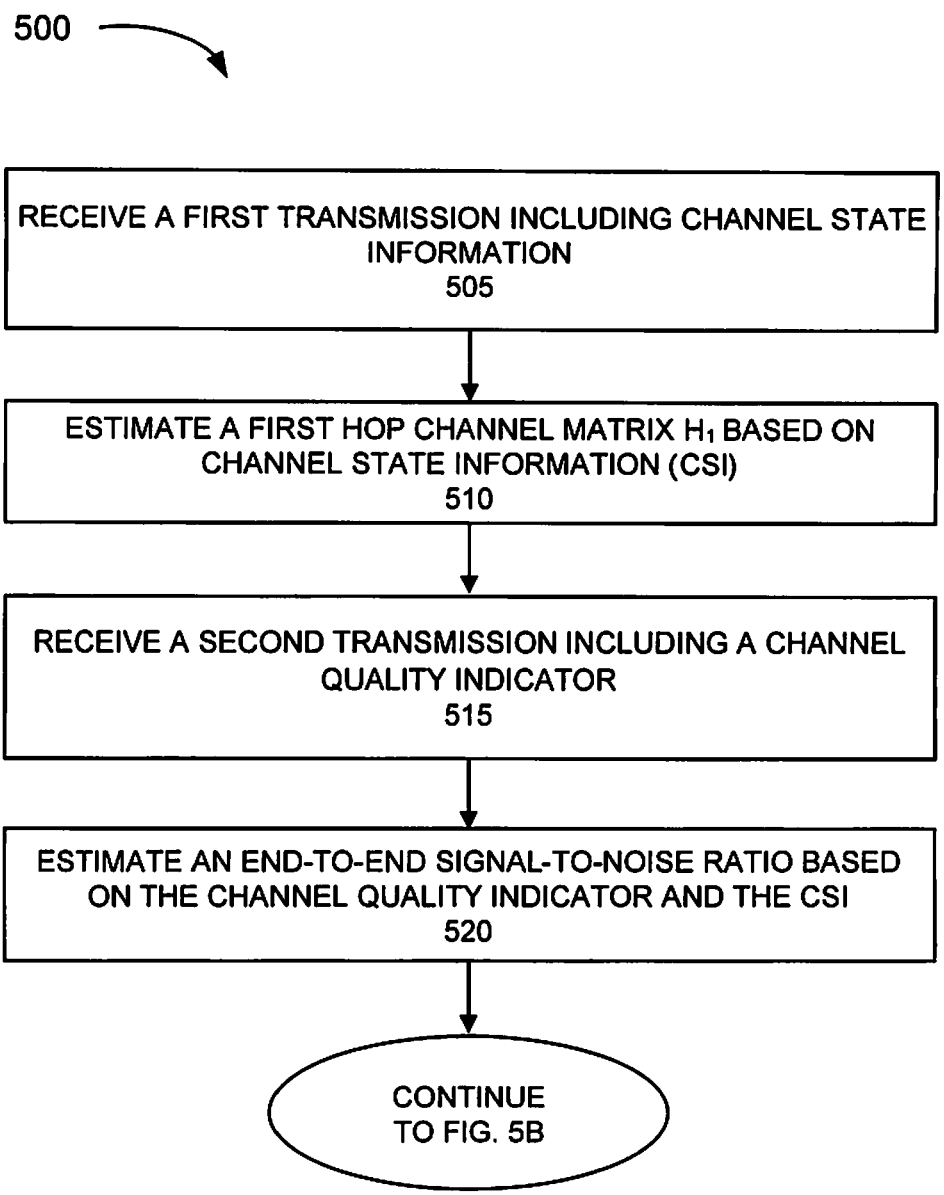
FIGS. 5A-5B are flow diagrams related to an exemplary process for adapting the operation of the intermediate device consistent with the concepts describe herein.
Figure 5B:
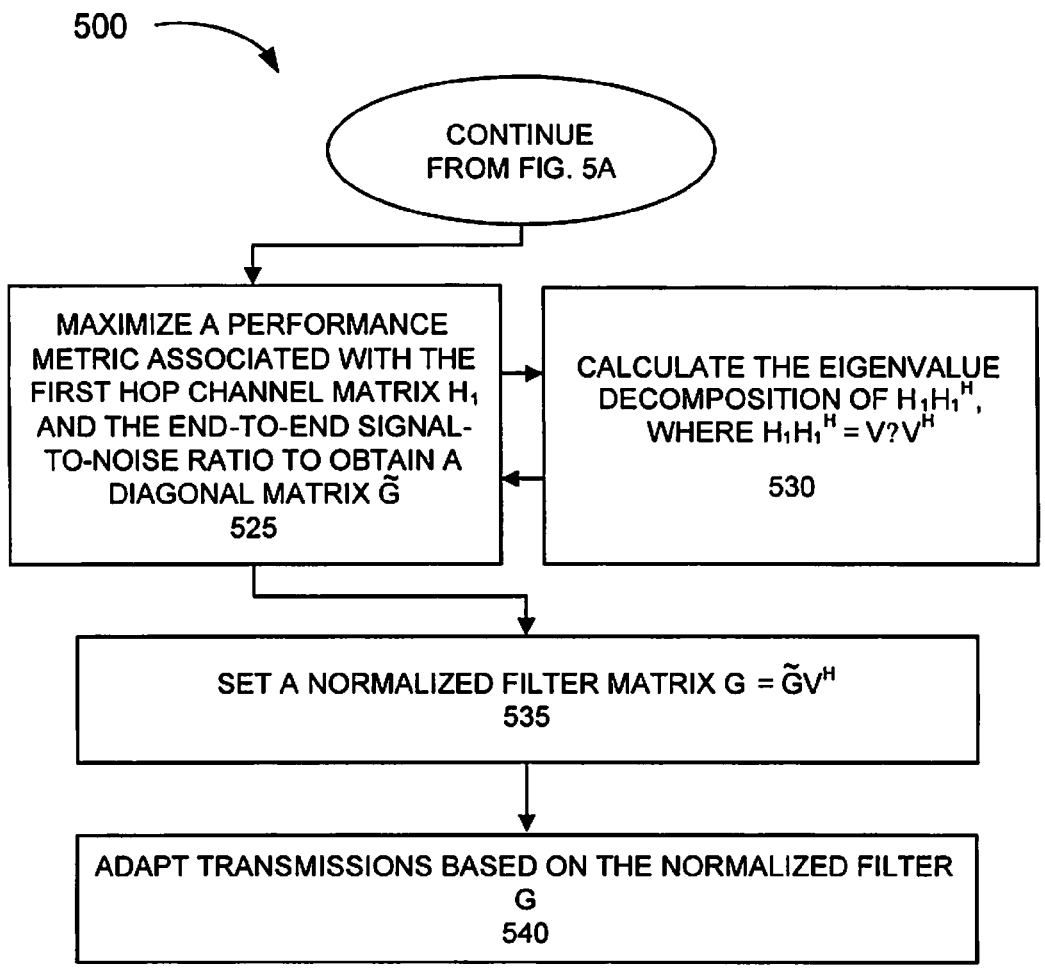
Figure 6:
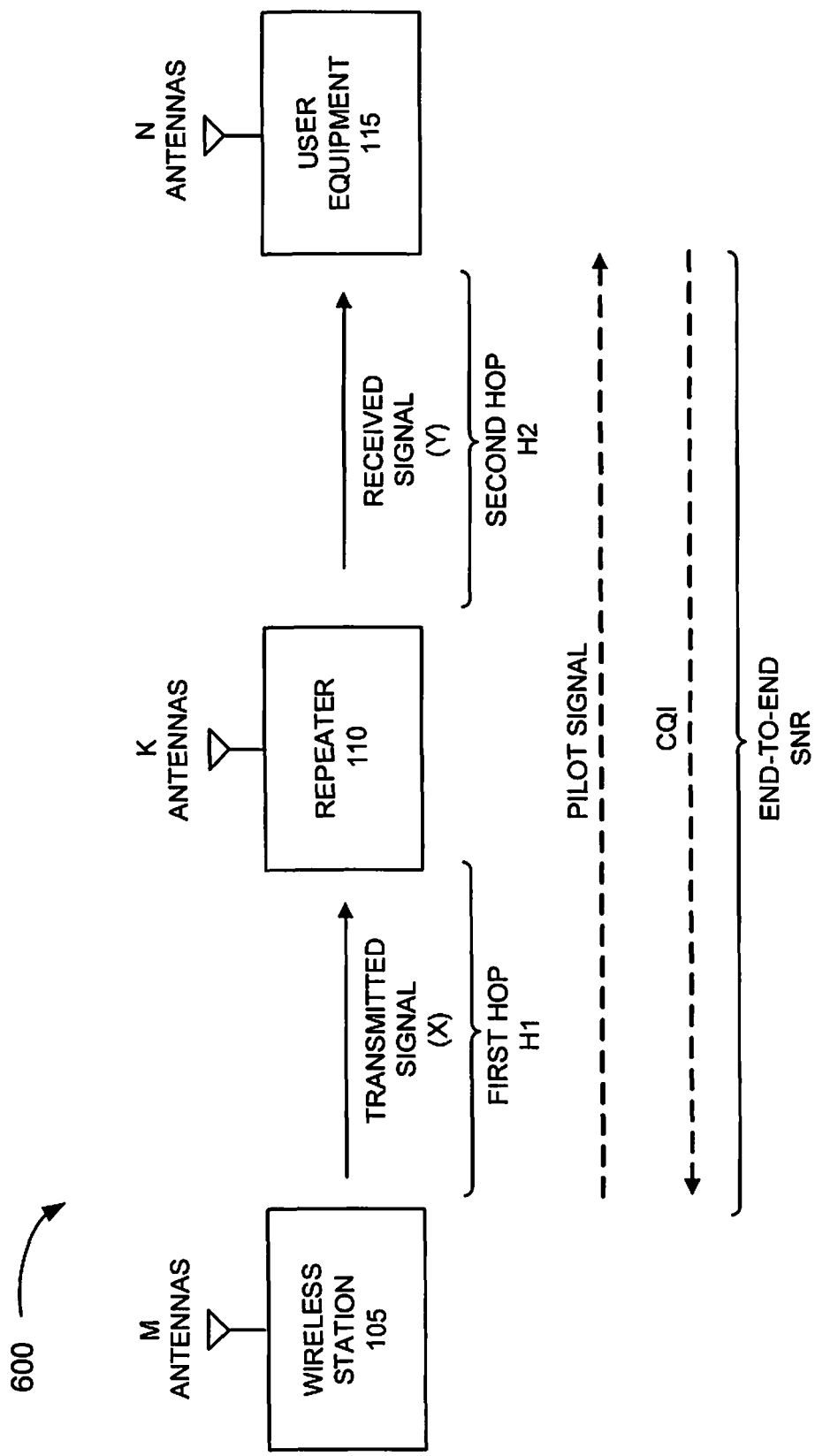
FIG. 6 is a diagram illustrating an exemplary scenario in which the processes described herein may be implemented.

FIGS. 5A and 5B are flow diagrams illustrating an exemplary process 500 that may be performed by repeater 110 for adapting a filter and/or amplifying components with respect to transmissions received and/or forwarded by repeater 110. In addition to FIGS. 5A and 5B, process 500 will be described in connection with previous Figures. Additionally, FIGS. 5A and 5B will be described in connection with FIG. 6. FIG. 6 is a diagram of an exemplary scenario 600 that is illustrative of the concepts described herein. It will be appreciated that, among other things, the order and the content of the transmissions described in connection with FIG. 6 are exemplary. Thus, exemplary process 500 and the concepts described herein have application to scenarios in which these particularities may be different.

Process 500 may begin with receiving a first transmission including CSI (block 505). For example, as illustrated in FIG. 6, wireless station 105 may transmit a signal that is received by repeater 110. The received signal may include, for example, a pilot signal. When the signal, which may be expressed as vector x, is transmitted from wireless station 105, the received signal at UE 115 may be expressed as:

$$y = (\sqrt{P/M}) H_2 G H_1 x + n \qquad (1)$$

where n is the noise vector with a zero mean, complex Gaussian distribution CN $(0, \sigma_n^2 I)$, P is the equivalent end-to-end power, M is the number of antennas of wireless station 105, G is a normalized filter matrix with trace $GG^H=1$, $H_1$ is a first hop channel matrix, and $H_2$ is a second hop channel matrix. In one implementation, the thermal noise at repeater 110 may be ignored since it may be assumed that repeater 110 operates in a high signal-to-noise (SNR) regime and the impact of thermal noise may not be significant. However, in other implementations, thermal noise may be considered. Additionally, in one implementation, the direct link may be ignored since it may be assumed that the direct link is relatively weak in comparison to the amplified link (i.e., the link via repeater 110). However, in other implementations, the direct link may be considered.

A first hop channel matrix $H_1$ may be estimated based on CSI (block 510). For example, filter calculator component 320 of repeater 110 may estimate the first hop channel matrix $H_1$ based on the CSI received from wireless station 105. Filter calculator component 320 may generate the first hop channel matrix $H_1$ using existing techniques. The CSI may include signal-to-noise information or some other type of CSI.

A second transmission including a channel quality indicator may be received (block 515). For example, as illustrated in FIG. 6, UE 115 may transmit a channel quality indicator (CQI) to wireless station 105 via repeater 110.

An end-to-end SNR may be estimated based on the channel quality indicator and the CSI (block 520). For example, repeater 110 may determine an end-to-end signal-to-noise ratio based on the received channel quality indicator and the first hop CSI. Additionally, or alternatively, repeater 110 may measure a second hop signal-to-noise ratio. Repeater 110 may calculate an end-to-end signal-to-noise ratio based on such measurements.

A performance metric associated with the first hop channel matrix $H_1$ and the end-to-end signal-to-noise ratio may be maximized to obtain a diagonal matrix $\tilde{G}$ (block 525). Returning to expression (1), the second hop channel matrix $H_2$ is not known at repeater 110. In accordance with the concepts described herein, it is proposed to calculate the normalized filter matrix G so as optimize system performance. For purposes of discussion, channel capacity may be optimized according to the exemplary expressions:

$$C = \log_2 \det\left(I + \frac{P}{M\sigma_n^2} H_2 G H_1 H_1^H G^H H_2^H\right) \qquad (2)$$

where C represents channel capacity. Filter matrix G may be maximized according to:

$$E_{H_2}(C) = E_{H_2}\left(\log_2 \det\left(I + \frac{P}{M\sigma_n^2} H_2 G H_1 H_1^H G^H H_2^H\right)\right) \qquad (3)$$

such that trace $(GG^H)=1$, and E( ) denotes the expectation.

Since $GH_1 H_1^H G^H$ is non-negative definite, it may be decomposed as $UDU^H$. Further, since the multiplying of a unitary matrix does not change the distribution of the second hop channel matrix $H_2$, equation (3) may be expressed as:

$$E_{H_2}(C) = E_{H_2}\left(\log_2 \det\left(I + \frac{P}{M\sigma_n^2} H_2 D H_2^H\right)\right) \qquad (4)$$

The expression $GH_1 H_1^H G^H$ may be set as a diagonal matrix $\tilde{G}$, and filter matrix G may be expressed as $G=\tilde{G}V^H$. V may be obtained by calculating an eigenvalue decomposition of $H_1 H_1^H$, where $H_1 H_1^H = V\Sigma V^H$ (block 530). For example, filter calculator component 320 may obtain V and $\Sigma$ by calculating the eigenvalue decomposition of $H_1 H_1^H$.

Based on the above, expression (3) may be re-expressed as:

$$E_{H_2}(C) = E_{H_2}\left(\log_2 \det\left(I + \frac{P}{M\sigma_n^2} H_2 \tilde{G}\Sigma\tilde{G}^H G^H H_2^H\right)\right) \qquad (5)$$

$$E_{H_2}(C) = E_{H_2}\left(\log_2 \det\left(I + \frac{P}{M\sigma_n^2} \tilde{G}\Sigma\tilde{G}^H H_2^H H_2\right)\right)$$

$$E_{H_2}(C) \leq E_{H_2}\left(\log_2 \prod_{i=1}^{K}\left(1 + \frac{P}{M\sigma_n^2}\left[\tilde{G}\Sigma\tilde{G}^H H_2^H H_2\right]_{i,i}\right)\right)$$

$$E_{H_2}(C) \leq \sum_{i=1}^{K} \log_2\left(1 + \frac{P}{M\sigma_n^2} E_{H_2}\left(\left[\tilde{G}\Sigma\tilde{G}^H H_2^H H_2\right]_{i,i}\right)\right)$$

$$E_{H_2}(C) \leq \sum_{i=1}^{K} \log_2\left(1 + \frac{P}{M\sigma_n^2} N (\tilde{G}_{i,i})^2 \Sigma_{i,i}\right)$$

where K represents the number of antennas at repeater 110.

Since directly maximizing expression (3) is difficult, the upper bound of expression (5) may be maximized base on the water-filling principle, such that $$\sum_{i=1}^{K} (\tilde{G}_{i,i})^2 = 1.$$

Thus, by maximizing expression (5), diagonal matrix $\tilde{G}$ may be obtained.

A normalized filter matrix G may be set based on $G=\tilde{G}V^H$ (block 535). For example, repeater 110 may configure a filter (e.g., a spatial filter) or an amplifying component based on the normalized filter matrix G.

Transmissions may be adapted based on the normalized filter matrix G (block 540). Repeater 110 may adapt transmissions received from or transmitted to wireless station 105 and/or UE 115 based on the normalized filter matrix G.

In situations where channel reciprocity exists (e.g., a time division duplex (TDD) system), repeater 110 may obtain CSI, or at least channel statistic information (i.e., statistics of a second hop channel), of the second hop based on channel reciprocity. As described below, in another embodiment, intermediate device 110 may adapt a filter or an amplifying component based on a filter matrix G. However, with respect to this exemplary process, a covariance matrix may be calculated to model a second hop channel matrix $H_2$.

Figure 7A:
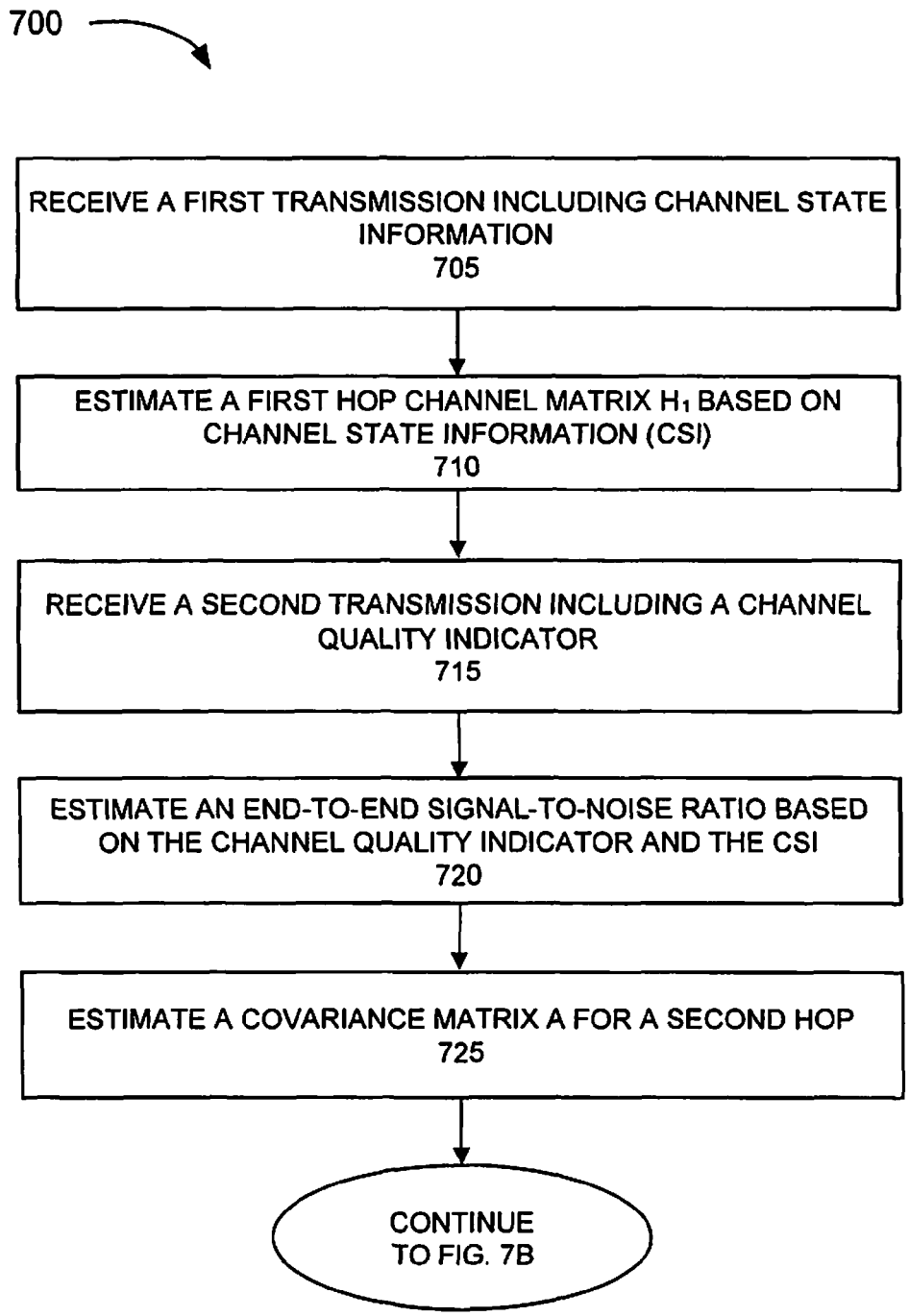
FIGS. 7A-7B are flow diagrams related to another exemplary process for adapting the operation of the intermediate device consistent with the concepts described herein.
Figure 7B:
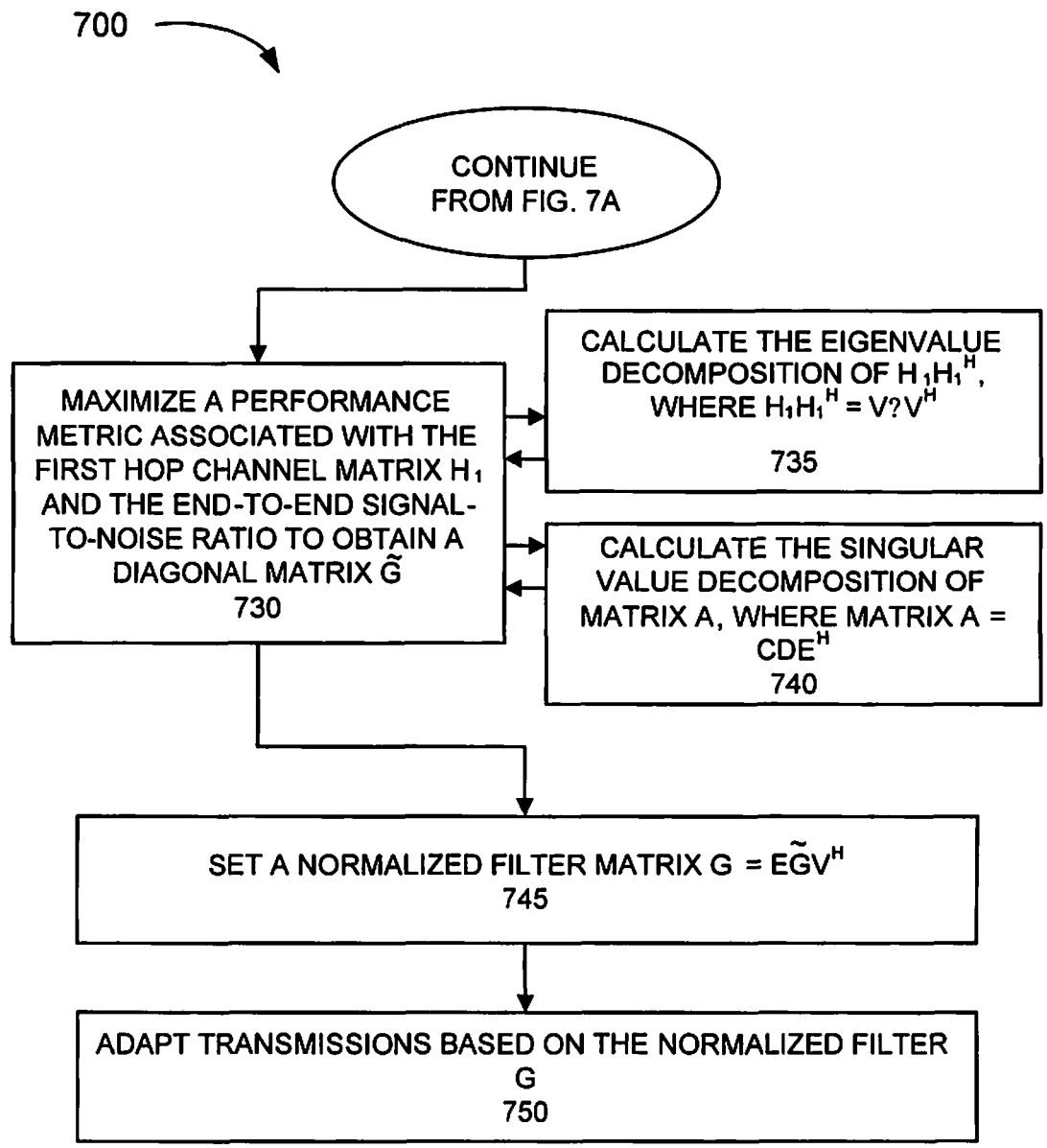

FIGS. 7A and 7B are flow diagrams illustrating an exemplary process 700 that may be performed by repeater 110 for adapting a filter and/or amplifying component with respect to transmissions received and/or forwarded by repeater 110. In addition to FIGS. 7A and 7B, process 700 will be described in connection with previous Figures. It will be appreciated that, among other things, the order and the content of the transmissions described herein are exemplary. Thus, exemplary process 700 and the concepts described herein have application to scenarios in which these particularities may be different.

Process 700 may begin with receiving a first transmission including CSI (block 705). For example, as illustrated in FIG. 6, wireless station 105 may transmit a signal that is received by repeater 110. The received signal may include, for example, a pilot signal. When the signal, which may be expressed as vector x, is transmitted from wireless station 105, the received signal at UE 115 may be expressed as:

$$y = (\sqrt{P/M}) H_2 G H_1 x + n \qquad (1)$$

where n is the noise vector with a zero mean, complex Gaussian distribution CN $(0, \sigma_n^2 I)$, P is the equivalent end-to-end power, M is the number of antennas of wireless station 105, G is a normalized filter matrix with trace $GG^H=1$, $H_1$ is a first hop channel matrix, and $H_2$ is a second hop channel matrix. In one implementation, the thermal noise at repeater 110 may be ignored since it may be assumed that repeater 110 operates in a high signal-to-noise (SNR) regime and the impact of thermal noise may not be significant. However, in other implementations, thermal noise may be considered. Additionally, in one implementation, the direct link may be ignored since it may be assumed that the direct link is relatively weak in comparison to the amplified link (i.e., the link via repeater 110). However, in other implementations, the direct link may be considered.

A first hop channel matrix $H_1$ may be estimated based on CSI (block 710). For example, filter calculator component 320 of repeater 110 may estimate the first hop channel matrix $H_1$ based on the CSI received from wireless station 105. For example, the CSI may include signal-to-noise information or some other type of CSI.

A second transmission including a channel quality indicator may be received (block 715). For example, as illustrated in FIG. 6, user terminal 115 may transmit a channel quality indicator to wireless station 105 via repeater 110.

An end-to-end signal-to-noise ratio may be estimated based on the channel quality indicator and the CSI (block 720). For example, repeater 110 may determine an end-to-end signal-to-noise ratio based on the received channel quality indicator and the first hop CSI. Additionally, or alternatively, repeater 110 may measure a second hop signal-to-noise ratio. Repeater 110 may calculate an end-to-end signal-to-noise ratio based on such measurements.

A covariance matrix A may be estimated for a second hop (block 725). The second hop channel is assumed to be with transmit-antenna correlation only, as UE 115 is more likely to be in a rich scattering environment. Given this assumption, the second hop channel matrix $H_2$ may be modeled based on the following exemplary expression:

$$H_2 = H_W A \qquad (6)$$

where $H_W$ is a matrix with independent and identically distributed, zero-mean, unit variance, circularly symmetric, complex Gaussian entries, and matrix A represents a correlation between transmit antennas.

A performance metric associated with the first hop channel matrix $H_1$ and the end-to-end signal-to-noise ratio may be maximized to obtain a diagonal matrix $\tilde{G}$ (block 730). Since matrix A is known at repeater 110, filter matrix G may be maximized according to:

$$E_{H_W}(C) = E_{H_W}\left(\log_2 \det\left(I + \frac{P}{M\sigma_n^2} H_W A G H_1 H_1^H G^H A^H H_W^H\right)\right) \qquad (7)$$

such that trace $(GG^H)=1$, and $E(\ )$ denotes the expectation.

Since $G H_1 H_1^H G^H$ is non-negative definite, it may be decomposed as $UDU^H$. Further, since the multiplying of a unitary matrix does not change the distribution of the second hop channel matrix $H_2$, equation (3) may be expressed as:

$$E_{H_2}(C) = E_{H_2}\left(\log_2 \det\left(I + \frac{P}{M\sigma_n^2} H_2 D H_2^H\right)\right) \qquad (4)$$

The expression $G H_1 H_1^H G^H$ may be set as a diagonal matrix $\tilde{G}$, and filter matrix G may be expressed as $G = \tilde{G} V^H$. V may be obtained by calculating an eigenvalue decomposition of $H_1 H_1^H$, where $H_1 H_1^H = V \Sigma V^H$ (block 735). For example, filter calculator component 320 may obtain V and Σ by calculating the eigenvalue decomposition of $H_1 H_1^H$. Additionally, E may be obtained by calculating the singular value decomposition (SVD) of matrix A, where $A = CDE^H$ (block 740). For example, filter calculator component 320 may obtain C and E by calculating the SVD of matrix A.

Based on the above, expression (7) may be re-expressed, employing a similar derivation as that in expression (5), as:

$$E_{H_W}(C) \leq \sum_{i=1}^{K} \log_2\left(1 + \frac{P}{M\sigma_n^2} N(\tilde{G}_{i,i})^2 \Sigma_{i,i}(D_{i,i})^2\right) \qquad (8)$$

Since directly maximizing expression (7) is difficult, the upper bound of expression (7) may be maximized base on the water-filling principle, such that $$\sum_{i=1}^{K} (\tilde{G}_{i,i})^2 = 1.$$

Thus, by maximizing expression (8), diagonal matrix $\tilde{G}$ may be obtained.

A normalized filter matrix G may be set based on $G = E \tilde{G} V^H$ (block 745). For example, repeater 110 may configure a filter (e.g., a spatial filter) or an amplifying component based on the normalized filter matrix G.

Transmissions may be adapted based on the normalized filter matrix G (block 750). Repeater 110 may adapt transmissions received from or transmitted to wireless station 105 and/or UE 115 based on the normalized filter matrix G.

Figure 8A:
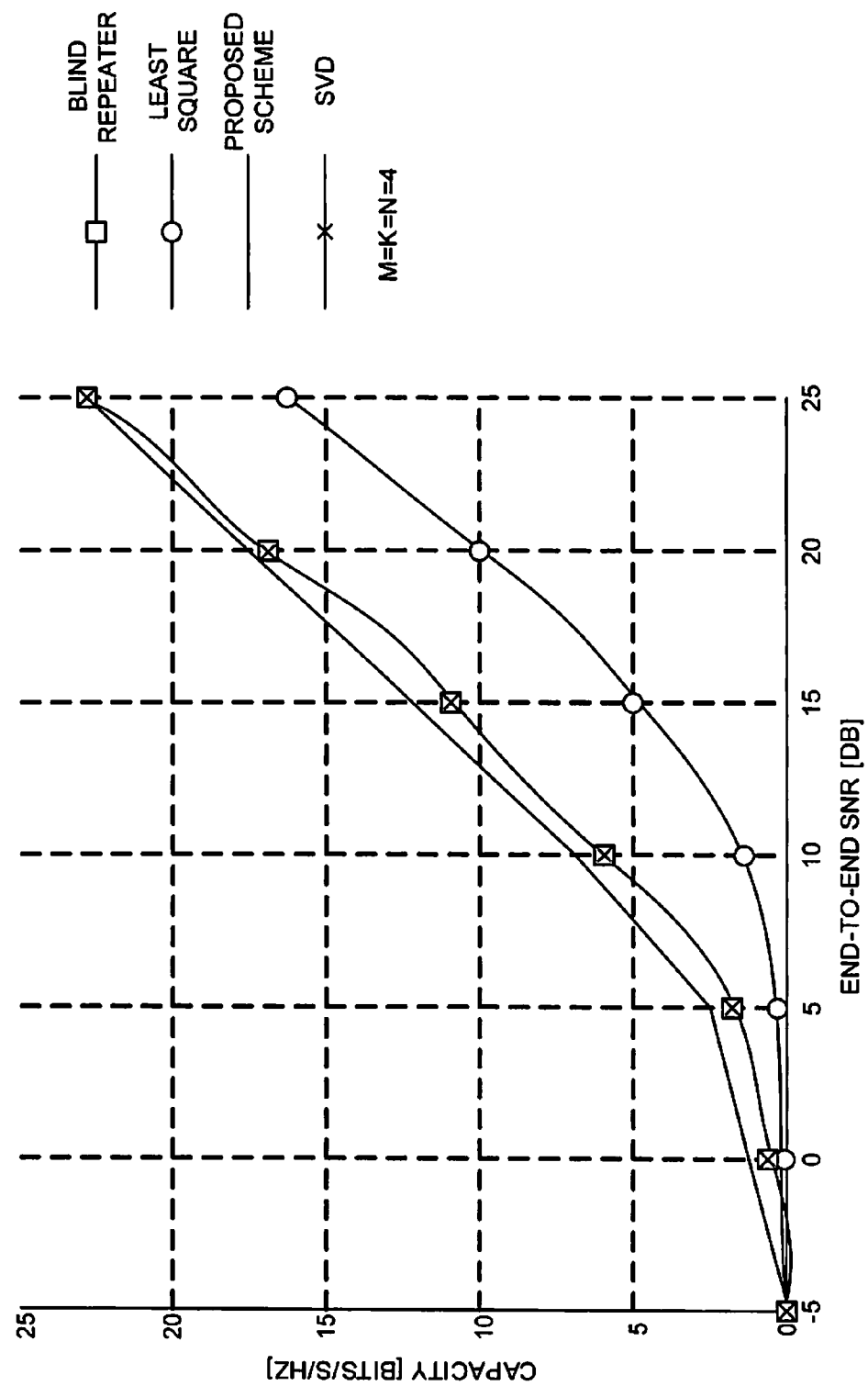
FIGS. 8A and 8B are diagrams illustrating simulation results between existing schemes employed by intermediate devices and the processes described herein.
Figure 8B:
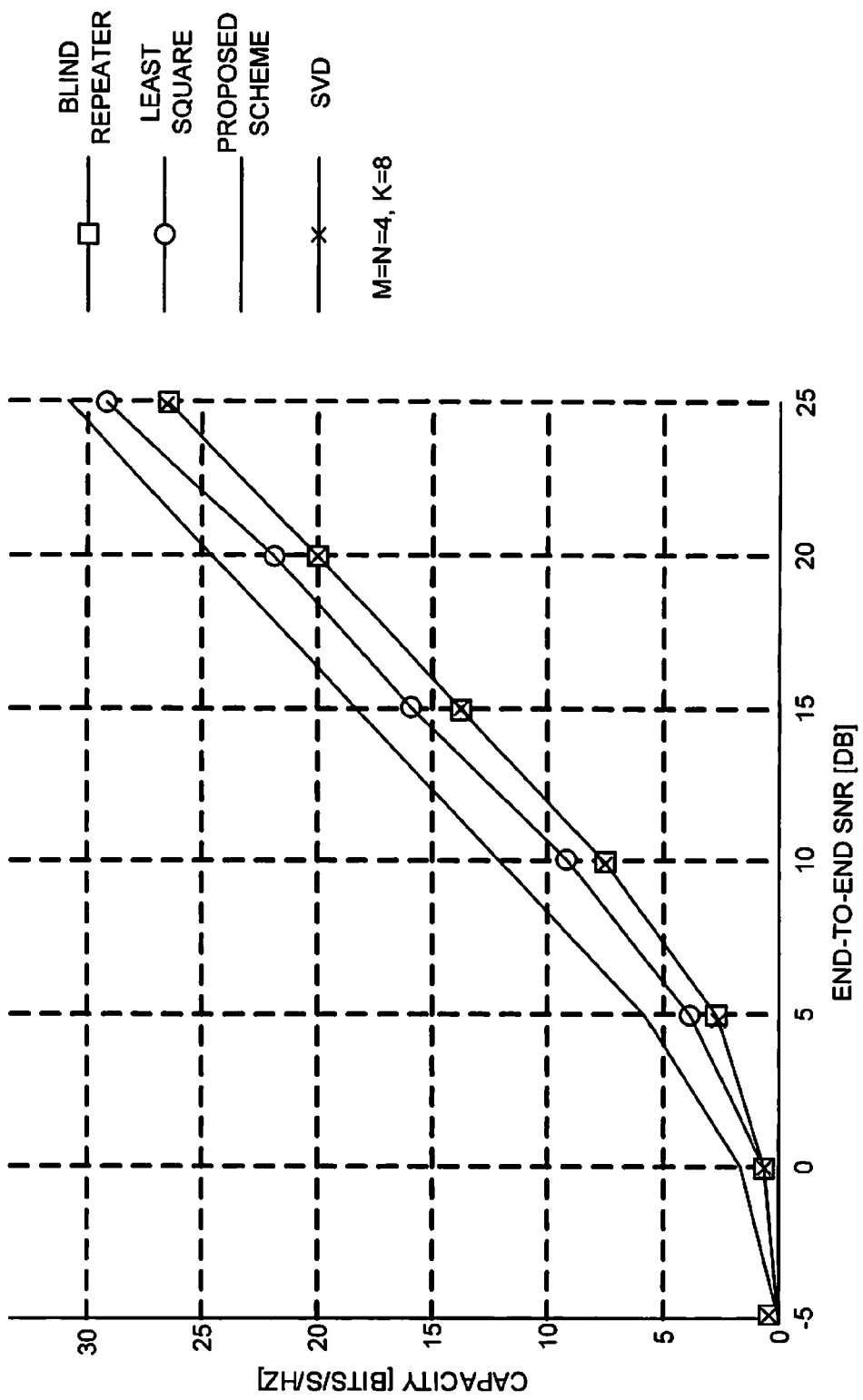

According to the concepts described herein, the performance of communication system 100 may be enhanced. FIGS. 8A and 8B are diagrams illustrating simulation results in which comparisons were made between existing schemes and the proposed scheme described herein.

Referring to FIG. 8A, performance comparisons between a blind repeater, a repeater utilizing a least square filter, a repeater utilizing SVD beamforming, and the proposed scheme were made. These existing schemes assume no CSI or only first hop CSI. The repeater of the proposed scheme utilizes first hop CSI and end-to-end SNR. Further, the simulation was conducted with M=K=N=4, where M, K, and N represent the number of antennas.

As illustrated in FIG. 8A, the proposed scheme outperforms all other schemes. For example, at SNR of 5 dB, the proposed scheme offers a gain in capacity of around 1 bit/s/Hz over the blind and SVD repeaters, and significantly more gain over the repeater employing a least square filter.

Referring to FIG. 8B, when the number of antennas at the repeater side increases (e.g., M=N=4, and K=8), the performance gain of the proposed scheme increases. Additionally, it is observable from the simulation results that the SVD beamforming and the blind repeater have the same performance. It may be inferred that when the CSI is not available at the transmitter side, only simple receiver-side SVD does not improve the performance.

As described, an intermediate device (e.g., a MIMO repeater) may account for channel state information (e.g., CSI for a received signal and average SNR) without adding additional overhead (e.g., signaling, feedback, etc.). Moreover, the performance of the intermediate device may be improved, while transparency is maintained. Simulation results indicate that the proposed scheme outperforms existing schemes, particularly when the number of antennas at the intermediate device is large. As a large number of antennas at the intermediate device may be needed to decrease the multi-keyhole effect, the concepts described herein have broad application in a variety of communication systems.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks has been described with regard to the processes illustrated in FIGS. 5A, 5B, 7A, and 7B, the order of the blocks may be modified in other implementations. Further, non-dependent blocks may be performed in parallel. Further one or more blocks may be omitted. It will be appreciated that one or more of the processes described herein may be implemented as a computer program. The computer program may be stored on a computer-readable medium or represented in some other type of medium (e.g., a transmission medium).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such.

The term "may" is used throughout this application and is intended to be interpreted, for example, as "having the potential to," "configured to," or "capable of," and not in a mandatory sense (e.g., as "must"). The terms "a" and "an" are intended to be interpreted to include, for example, one or more items. Where only one item is intended, the term "one" or similar language is used. Further, the phrase "based on" is intended to be interpreted to mean, for example, "based, at least in part, on," unless explicitly stated otherwise. The term "and/or" is intended to be interpreted to include any and all combinations of one or more of the associated list items.

The invention claimed is:

1. A method performed by an intermediate device in a wireless network including a first hop between a first device and the intermediate device, and a second hop between the intermediate device and a second device, the method comprising:
   estimating a first hop channel state based on a transmission associated with the first device;
   estimating an end-to-end signal-to-noise ratio based on a transmission associated with the second device; and
   adapting a filter or an amplifier of the intermediate device based on the first hop channel state and the end-to-end signal-to-noise ratio.

2. The method of claim 1, further comprising: estimate a first hop channel matrix based on the first hop channel state.

3. The method of claim 2, further comprising: performing an eigenvalue decomposition based on the first hop channel matrix.

4. The method of claim 1, further comprising:
   maximizing a performance metric associated with the first hop channel matrix and the end-to-end signal-to-noise ratio.

5. The method of claim 4, where the performance metric includes channel capacity.

6. The method of claim 4, where the maximizing includes applying a water-filling principle.

7. The method of claim 1, where the intermediate device includes a multiple-input multiple-output antenna system.

8. The method of claim 1, where the wireless network includes a time division duplex system where channel reciprocity exists between the first device and the second device.

9. The method of claim 8, further comprising:
   estimating channel statistic information of the second hop based on the channel reciprocity; and
   estimating a covariance matrix based on the channel statistic information.

10. The method of claim 9, further comprising:
    performing a singular value decomposition of the covariance matrix; and utilizing a resultant of the singular value decomposition to calculate a filter matrix.

11. The method of claim 1, where the first device includes a base station.

12. The method of claim 1, where the second device includes a user terminal.

13. The method of claim 1, where the intermediate device operates according to a long term evolution standard.

14. An intermediate device in a wireless environment including a first hop between a first device and the intermediate device and a second hop between the intermediate device and a second device, the intermediate device comprising:
one or more antennas; and
a processing system configured to:
estimate a first hop channel state based on a transmission from the first device;
estimate an end-to-end signal-to-noise ratio or a second hop signal-to-noise ratio based on a transmission from the second device; and
adapt a filter or an amplifier based on the first hop channel state and at least one of the end-to-end signal-to-noise ratio or the second hop signal-to-noise ratio.

15. The intermediate device of claim 14, where the intermediate device includes a repeater having a multiple-input multiple output antenna system.

16. The intermediate device of claim 14, where channel reciprocity exists between the first device and the second device and where the processing system is further configured to:
estimate channel statistic information of the second hop based on the channel reciprocity.

17. The intermediate device of claim 16, where the processing system is further configured to:
estimate a covariance matrix based on the channel statistic information.

18. The intermediate device of claim 17, where the processing system is further configured to:
perform a singular value decomposition of the correlation matrix; and
determine an orthogonal matrix.

19. The intermediate of claim 18, where the adapting of the filter or the amplifier is based on the orthogonal matrix.

20. The intermediate device of claim 14, where the processing system is further configured to:
estimate a first hop channel matrix based on the first hop channel state; and
perform an eigenvalue decomposition based on the first hop channel matrix.

21. The intermediate device of claim 20, where the processing system is further configured to:
calculate a diagonal filter matrix based on a resultant of the eigenvalue decomposition.

22. The intermediate device of claim 21, where the processing system is further configured to:
calculate a filter matrix based on the diagonal filter matrix and the resultant of the eigenvalue decomposition.

23. A computer program including instructions stored on non-transient computer readable media which, when executed, perform the acts of:
estimating a first hop channel state based on a received first hop transmission;
estimating second hop signal-to-noise ratio or an end-to-end signal-to-noise ratio based on a received second hop transmission; and
adapting at least one of a filter or an amplification parameter based on the first hop channel state and at least one of the second hop signal-to-noise ratio or the end-to-end signal-to-noise ratio.

24. The computer program of claim 23, where the computer program is stored on a computer-readable medium of an intermediate forwarding device operating in a multi-hop wireless network.

25. The method of claim 1, further comprising configuring a filter matrix of the filter or the amplifier of the intermediate device based on the first hop channel state and the end-to-end signal-to-noise ratio.

26. The intermediate device of claim 14, where the processing system is configured to configure a filter matrix of the filter or the amplifier of the intermediate device based on the first hop channel state and the end-to-end signal-to-noise ratio.

27. The computer program of claim 23, wherein when executed the instructions perform the act of configuring a filter matrix of the filter or the amplifier of the intermediate device based on the first hop channel state and the end-to-end signal-to-noise ratio.

* * * * *